United States Patent [19]

Schwarz

[11] 4,271,358
[45] Jun. 2, 1981

[54] SELECTIVE INFRARED DETECTOR

[76] Inventor: Frank Schwarz, 156 Thunderhill Dr., Stamford, Conn. 06902

[21] Appl. No.: 93,859

[22] Filed: Nov. 13, 1979

[51] Int. Cl.$^3$ ............................ G01J 1/00; G02B 5/22
[52] U.S. Cl. ....................................... 250/338; 250/342; 350/1.1
[58] Field of Search ............ 350/1.1, 311, 1.6; 250/221, 226, 338, 342

[56] References Cited

U.S. PATENT DOCUMENTS

| 2,742,837 | 4/1956 | Strerffert | 250/226 |
| 2,960,612 | 11/1960 | Koulicovitch | 250/338 |
| 3,103,585 | 9/1963 | Johnson et al. | 250/352 |
| 3,459,503 | 8/1969 | Roy et al. | 350/1.1 |
| 3,665,179 | 5/1972 | McLintic | 350/1.6 |

FOREIGN PATENT DOCUMENTS 2801665 7/1978 Fed. Rep. of Germany ............ 350/1.6

Primary Examiner—Alfred E. Smith
Assistant Examiner—Carolyn E. Fields
Attorney, Agent, or Firm—Robert Ames Norton

[57] ABSTRACT

Infrared detectors, such as thermistors, thermocouples, thermopiles, pyroelectric detectors, and the like, are rendered insensitive to short wave radiation, such as the visible or near infrared, but sensitive to longer wave infrared, for example, beyond $4.5\mu$ by coating the active surface of the detector with a strong reflector of visible light but which absorbs infrared at least in the range from $7\mu$ to somewhat beyond $10\mu$. A preferred example of the paint, which appears white to the eye, is titanium dioxide, but this is not the only material which can be used as any white or strongly diffuse reflecting coating which absorbs in the infrared from $7\mu$ on can be used. The infrared instrument for which the detector is particularly useful is an intrusion detector or burglar alarm which is activated by the infrared radiation from the intruder, which is in the range from around $7\mu$ to $10\mu$ and beyond. The strongly diffuse reflecting action in the visible prevents false alarms from ambient light. As is common, the detector can be mounted in a housing which protects it and which is provided with a window that transmits infrared. Improved differential sensitivity is obtained by coloring the window, which may be of a plastic such as polyethylene, with dyes or pigments which are opaque or poor transmitters for visible light.

6 Claims, 2 Drawing Figures

SELECTIVE INFRARED DETECTOR

BACKGROUND OF THE INVENTION

Most infrared detectors, such as thermistors, thermocouples, thermopiles, pyroelectric detectors, etc., are normally blackened to enhance infrared absorption. For blackening, lamp black has been used, but more modern, very flat black paints have replaced it.

It has been proposed to make selective infrared detectors which reject short wave radiation, such as, for example, visible light or near infrared. This has been done with multilayer interference filters using germanium, and while such composite detectors are operative, their cost is extremely high. For example, in instruments such as intrusion detectors, commonly called burglar alarms, the interference filter may be the most expensive part of the whole instrument; and for many uses, such as, for example, detectors for home use, the cost may become substantially prohibitive.

Intrusion detectors are well known, a typical example being shown in my earlier U.S. Pat. No. 3,760,399, Sept. 18, 1973. The detector is an all active thermocouple with strips of alternating polarity. In other words, it modulates any infrared signals received from a moving intruder. This in a rough way produces differential sensitivity because steady signals do not cause the logic circuits to respond. However, in a home, headlights from passing cars can give a false alarm.

The broad idea of reflecting short wave radiation while permitting infrared radiation to pass has been proposed for an entirely different purpose and instrument, namely a mirror for concentrating the light of a projection lamp for motion picture projection or other film projection. One of the problems is that the powerful light source also transmits large amounts of infrared radiation, which heats up the gate of the motion picture projector; and if it is attempted to increase brightness by greatly increasing light output, film can be damaged. Similarly, in the case of slide projectors the same problem arises and it is necessary to cool the film. An ingenious solution for the light concentrating mirror is shown in the U.S. Pat. No. to Turner 2,660,925, Dec. 1, 1953, in which the mirror has multiple layers, including a layer which strongly reflects visible light but permits infrared to pass through. Thus the emerging light which encounters the film gate has a large portion of the heating rays eliminated. Another general use of selective radiation is shown in the Pearson et al U.S. Pat. No. 3,445,444. A more remote application of the general principles is shown in the Jackson U.S. Pat. No. 2,721,275, Oct. 18, 1955, for detecting aircraft. in this case, instead of preventing short wave radiation from striking the detector, a separate detector receives visible light from the sky or other sources and in the electronic amplifiers this signal opposes that of the longer wavelength signal from the aircraft itself, usually the exhaust of the aircraft motor. In other words, the effect of short wave radiation is balanced out electrically. Such a system, of course, is not very practical for an intrusion detector and is also quite expensive. It is with a low cost, simple instrument and detector, especially for intrusion detectors, that the present invention deals.

SUMMARY OF THE INVENTION

The present invention coats an infrared detector not with a flat black, more general absorber but with a highly diffuse reflective, very thin paint which reflects short wave radiation but which absorbs and transmits infrared from about $5\mu$ or $6\mu$ on, well into the long wave infrared. While titanium dioxide is the preferred white paint, any other strong reflector in the short wave radiation which has reasonable absorption in the infrared, particularly from around $7\mu$ to $10\mu$ and beyond, may be used. The invention is, therefore, not in its broader aspects limited strictly to the use of the preferred material, titanium dioxide.

It should be noted that the present invention is not directed broadly to an infrared detector or instrument in which the short wave reflector is used. In other words, it is not necessary to blacken the detector and then coat it with the white coating, such as titanium dioxide. As a matter of fact, this is undesirable for use in an intrusion detector because it increases the mass of the absorbing coating and therefore decreases the sensitivity of the detector to very short exposures. In other words, if an intruder moves very rapidly, the greater the mass of absorbing material on the detector, the poorer the detector is because it takes quite an appreciable time to heat up the additional mass. In the present invention the titanium dioxide coating, which is very thin because of its tremendous reflective powers in the short wave radiation, shows high absorption at the longer wave infrared at which the radiation from an intruder peaks. This absorption for a thin coating is in excess of 85%. In other words, in the present invention the very thin coating of titanium dioxide not only replaces blackening and eliminates a very expensive interference filter but, without rendering the device inoperative, it actually represents some improvement in detector time constant. While it is an excellent basis for patentability if at least one or more elements from a formerly used device are eliminated without eliminating their function, if the final result is actually an improved device the basis for patentability is greatly increased. That is the case in the present invention, which eliminates a very expensive element and produces not only as good results but somewhat better results.

While the detector of the present invention may be used alone and gives improved results, it is usually desirable to protect a detector from dust and other contaminants and also from short wave radiation. Normally this is a housing with a window which transmits infrared radiation. Many polyhydrocarbon plastics, such as polyethylene, are excellent transmitters for longer wave infrared. It is possible, at negligible increase in cost, to still further enhance the selectivity of the detector by adding to the plastic, such as polyethylene, dyes or coloring matter which strongly absorb in the visible but which are not strong absorbers in the farther infrared. It has been proposed to use some finely divided pigments instead of a dye, or to have microscopic pores. Such a material is described in Sloane U.S. Pat. No. 3,471,212, Oct. 7, 1969, and the use of oxide layers in a multilayer filter is also described in the Ritter et al U.S. Pat. No. 3,853,386, Dec. 10, 1974. Such materials can be used in the window of the detector housing, which is described above. The housing itself can protect against unwanted short wave radiation coming in from the side, and the filter in the window increases the extremely high differential selectivity of the detector. While the invention is not limited to a detector housed in a housing with a filtering window, in a more specific aspect this combination is included. Since intrusion detectors or burglar alarms are well known instruments, the present invention is not limited to any particular special design. The Schwarz U.S. Pat. No. 3,760,399, referred to in a preceding section, is typical, and no special construction of intrusion detector is to be considered a limitation of the present invention.

DESCRIPTION OF THE PREFERRED EMBODIMENTS

Figure 1:
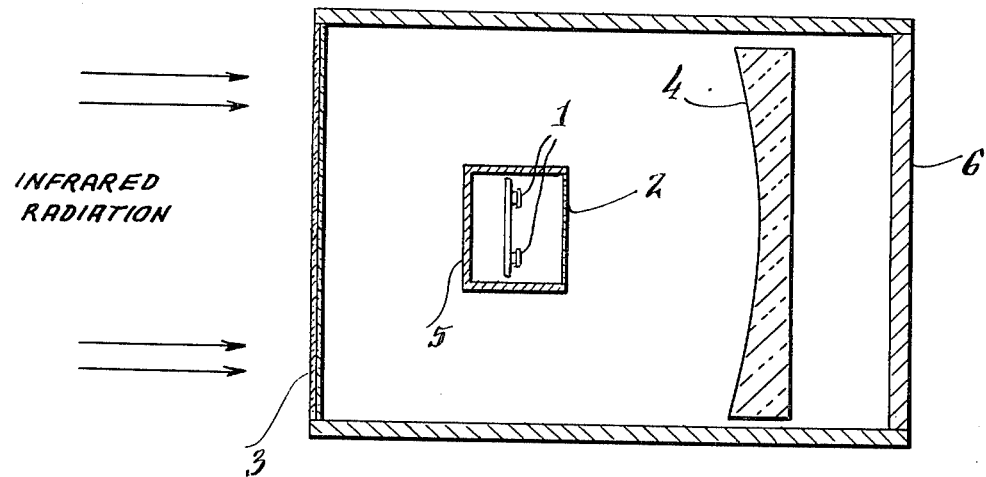
FIG. 1 is a diagrammatic representation of a detector of the present invention in a housing with a window.

FIG. 1 shows a detector and housing with detector elements (1) in a subhousing (5) with window (2), which subhousing is in turn mounted in a housing (6), which also contains a primary mirror (4) and one or more thin film windows (3).

Figure 2:
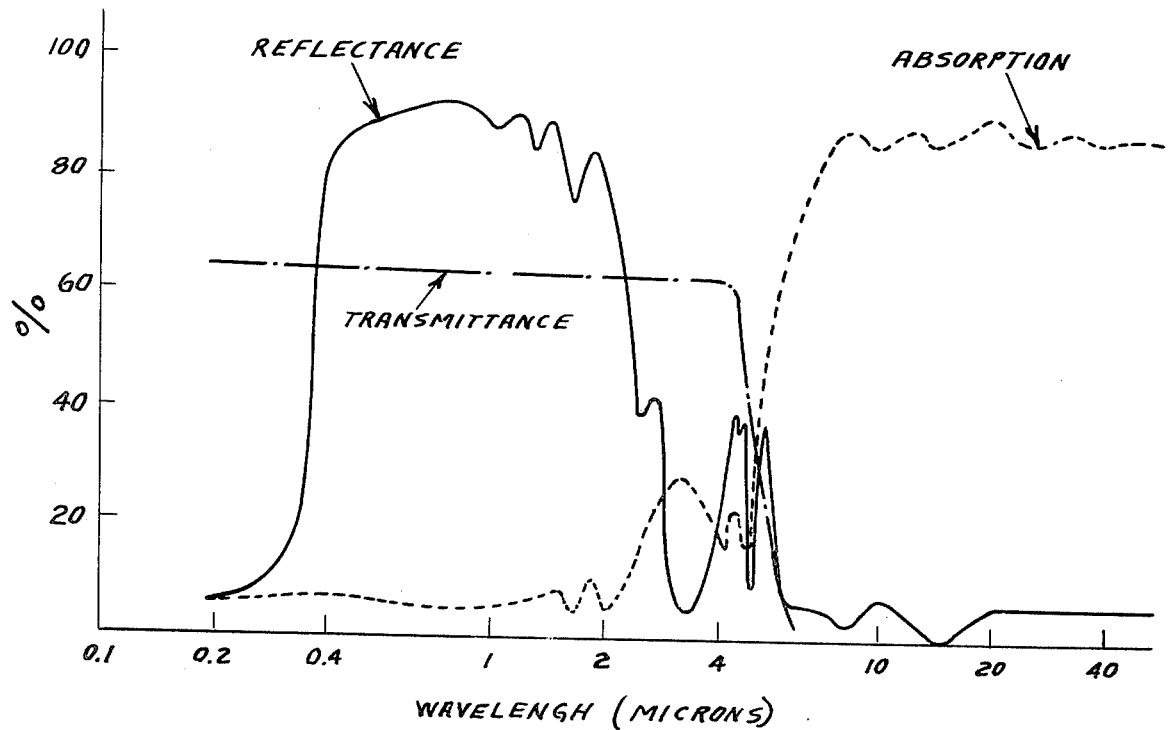
FIG. 2 shows transmittance and absorption curves of a thin layer of titanium dioxide.

FIG. 2 shows curves of reflectance, transmittance and absorption of titanium dioxide paint at various wavelengths in microns. It will be noted that the reflectance curve, (solid) shows a high reflectance in the visible and near infrared. The transmittance curve, (-- . --) shows good infrared transmittance up to about 4 microns. The absorption curve, (- - -) shows low low absorption up to about 4 microns, rapidly rising to a high value at about 7 microns and remaining at this high value in the further infrared.

For the preferred intrusion detector system a detector and housing of FIG. 1 can be mounted in a detector system of the Schwarz patent above referred to, and for this purpose the patent is incorporated into the present specification. When an intruder, as shown in the Schwarz patent, passes into the field of view of a detector of FIG. 1, the differential radiation between intruder and background, which peaks around $9\mu$ to $10\mu$, actuates the detectors of FIG. 1, and an alarm is given by the conventional circuits, (not shown except that a typical system for a moving intruder is shown in the Schwarz patent).

False alarms are prevented even though a room or other structure being protected is brightly illuminated or even if, in the case of a room with a window, it is exposed to passing headlight beams of automobiles. The selectivity of the detector is very great, and the short wave radiation does not actuate the detector. False alarms are not given, and the sensitivity of the infrared detector can be maintained at a high point. As has been described in the preceding section, the differential sensitivity of the detector is not only at least as good as the more expensive and complicated detectors of the past but can be better. Because the thin film of white paint, such as titanium dioxide, has a very low mass, even very transient exposure to radiation from the intruder is sensed and an alarm given.

I claim:

1. An infrared detector substantially insensitive to short wave radiation, such as radiation in the visible, and responsive to infrared radiation at least in the range longer than $7\mu$, which comprises, in combination, a thermal detector coated with a thin film of a white material having a very high diffusely reflective power in the visible and absorbing in the longer infrared, whereby the detector is capable of giving responses in the longer infrared and at the same time reflects strongly in the short wave radiation, preventing false responses from short wave radiation, such as visible light.

2. An intrusion detector responsive to infrared radiation at least in the $7\mu$ to $10\mu$ range in which the detector is a detector according to claim 1.

3. An intrusion detector according to claim 2 in which the detector is housed in a housing having a window transmitting in the infrared and absorbing in the visible.

4. A detector according to claim 1 in which the coating is a thin layer of titanium dioxide.

5. An intrusion detector responsive to infrared radiation at least in the $7\mu$ to $10\mu$ range in which the detector is a detector according to claim 4.

6. An intrusion detector according to claim 5 in which the detector is housed in a housing having a window transmitting in the infrared and absorbing in the visible.

* * * * *